United States Patent [19]

Fiocco

[11] Patent Number: 4,634,578

[45] Date of Patent: Jan. 6, 1987

[54] HIGH CAPACITY RECIPROCATING PLATE EXTRACTOR

[75] Inventor: Robert J. Fiocco, Summit, N.J.

[73] Assignee: Exxon Research and Engineering Company, Florham Park, N.J.

[21] Appl. No.: 808,477

[22] Filed: Dec. 13, 1985

[51] Int. Cl.$^4$ .............................................. B01D 11/04
[52] U.S. Cl. .................................................. 422/257
[58] Field of Search ................ 422/256, 257, 211, 215

[56] References Cited

U.S. PATENT DOCUMENTS

| | | | |
|---|---|---|---|
| 2,662,001 | 12/1953 | Burns et al. | 422/257 X |
| 3,108,859 | 10/1963 | Koski | 422/257 X |
| 4,444,729 | 4/1984 | Gradl et al. | 422/257 X |

OTHER PUBLICATIONS

I&EC Process Design and Development, Robert M. Wellek, et al., "A Liquid Extraction Column with Reciprocated Wire Mesh Packing", vol. 8, No. 4, Oct. 1969, pp. 515–527.

*Primary Examiner*—Tom Wyse
*Attorney, Agent, or Firm*—Joseph J. Dvorak

[57] ABSTRACT

The present invention comprises a reciprocating plate extractor column having a coalescence media located at least in the zone within the column where emulsions are likely to be formed. Preferably, the coalescence media is one which will be wetted by the dispersed phase under conditions of use. More preferably, however, the coalescence media will be a combination of two materials, one of which is wetted by the dispersed phase and one of which is wetted by the continuous phase. Also, in one embodiment of the present invention, anti-bypass means are included to direct the flow of fluid from the coalescence media toward the zone containing the reciprocating plates.

11 Claims, 4 Drawing Figures

HIGH CAPACITY RECIPROCATING PLATE EXTRACTOR

BACKGROUND OF THE INVENTION

This invention relates to reciprocating plate extractors useful for liquid extraction processes. More particularly, it relates to improvements in reciprocating plate extractors whereby coalescing surfaces are located in the vicinity of the plate stacks in the extractor thereby enhancing the coalescence rate of emulsion droplets which otherwise limit the capacity of the extractor.

Solvent extraction processes are well established techniques in the petroleum, pharmaceutical and chemical industries. Indeed, various types of mechanical agitation have been used in liquid-liquid extractors in an attempt to improve the mass transfer efficiency of such extractors. For example, pulsating energy is one technique that has been employed for obtaining a high rate of mass transfer in a liquid-liquid extractor. More recently, reciprocating plate extractors have been employed to introduce mechanical agitation because of their energy efficiency.

As is known, the flow limiting phenomena in reciprocating extractors results from a build up of droplets, for example, the formation of an emulsion in certain zones between the plates in the extractor. These emulsion droplets eventually progress to the wrong end of the column and in such instances the extractor is said to be flooded. In general, to avoid flooding the mixing energy is reduced, for example, by altering the plate spacing or by altering the amplitude or frequency of plate motion. Unfortunately a reduction in mixing energy results in a reduction in efficiency of the extractor.

Therefore, there remains a need for reciprocating plate extractors which are less prone to flooding and which have greater flow capacity than is presently achieved with reciprocating plate extractors.

SUMMARY OF THE INVENTION

Simply stated, the present invention comprises a reciprocating plate extractor column having a coalescence media located at least in the zone within the column where emulsions are likely to be formed. Preferably, the coalescence media is one which will be wetted by the dispersed phase under conditions of use. More preferably, however, the coalescence media will be a combination of two materials, one of which is wetted by the dispersed phase and one of which is wetted by the continuous phase.

In one embodiment of the present invention, the coalescence media is located vertically around the periphery of at least a part of the plate stack.

In a second and alternate embodiment of the present invention, the coalescence media is located horizontally at least between two plates within the stack.

These and other important features of the present invention will become readily apparent upon a reading of the detailed description in conjunction with the drawings.

DETAILED DESCRIPTION OF THE INVENTION

Figure 1:
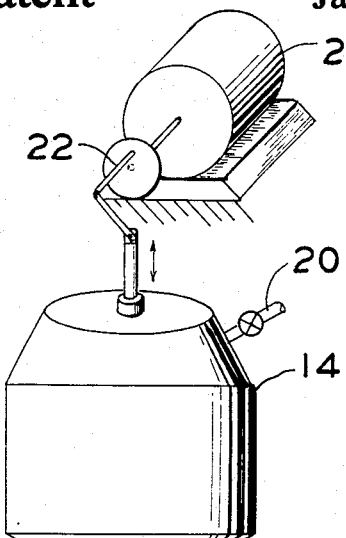
FIG. 1 is a side elevational view and section of a reciprocating plate extractor in accordance with one embodiment of the present invention.

Referring now to FIG. 1 of the drawings, reference numeral 10 designates an extractor which is provided with a plurality, or stack, of perforated plates 11 horizontally arranged within the vertical shell 12 of the column proper of extractor 10. Also as can be seen from FIG. 1, extractor 10 includes an upper settling section 14 and a lower settling section 15. In the FIG. 1 embodiment, the settling sections 14 and 15 are shown as having larger diameters than the diameter of the column proper; however, the diameter of the settling sections optionally may be the same as the diameter of the column proper.

The extractor 10 is provided with inlet means 16 and 19 for the introduction of a heavy and light phase, respectively, into the extractor for passage therethrough.

Upper settling section 14 is provided with outlet means 20 for removal of the light phase after its passage through the column proper of extractor 10. Similarly, the lower settling zone 15 contains an outlet means 17 for the removal of the heavy phase after its passage through the column proper of extractor 10.

The stack of perforated plates 11 situated within shell 12 of the column proper are fastened to a rod 21 which in turn is connected to an eccentric 22 driven by motor 24 that imparts a harmonic motion to the stack of perforated plates. It is this harmonic motion, imparted to the plates, that promotes and enhances intimate contact of the liquids flowing through the extractor.

As is known, the spacing of the plates in reciprocating plate extractors need not be uniform, as is shown for perforated plates 11 of the extractor 10 of FIG. 1. Typically, in the extractor of the present invention, the spacing of perforated plates 11 will be increased in the zones prone to emulsion formation in contrast to zones less prone to emulsion formation. Also, in general, the spacing of perforated plates 11 will be in the range of from about 1 to about 12 inches.

Figure 2:
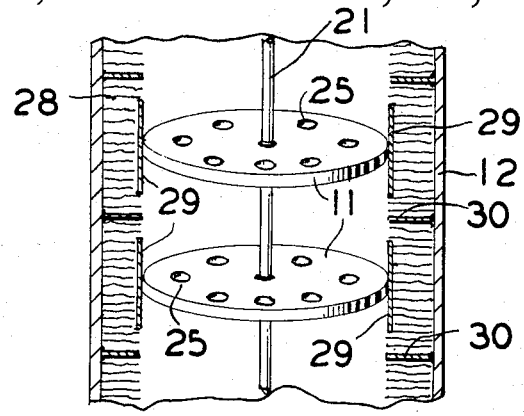
FIG. 2 is a sectional view partly in perspective showing in greater detail the vertical arrangement of the coalescence media around the periphery of the plate stacks.

Referring now to FIG. 2, it can be seen that the plates 11 are provided with a plurality of relatively small apertures 45 through which the dispersed phase, and alternately, continuous phase flows.

Importantly in the practice of the present invention, coalescence media is located, in the column proper of the extractor, at least in a zone which is emulsion prone. Optionally, of course, coalescence media is provided throughout the column proper. As is shown in FIGS. 1 and 2, the coalescence media 28 is arranged around the periphery of the stack of reciprocating plates 11. This coalescence media may be selected from a wide range of materials, such as knitted wire mesh and other fibrous materials, such as screening and the like. In the practice of the present invention, it is particularly preferred that the coalescence media 28 be a material which will be wetted by the dispersed or discontinuous phase. More preferably the coalescence media is a combination of materials, i.e., one which is wetted by the light phase and one which is wetted by the heavy phase. Indeed, when the coalescence media is a combination of materials, it is unimportant whether the dispersed phase is the light phase or the heavy phase. The coalescence media 48, of course, will have sufficient void fraction so as not to inhibit the flow of the continuous phase through the extractor. For example, the coalescence media will have greater than 90% void fraction, e.g., from about 90% to 99% and preferably greater than 98%. Thus, the coalescence media imparts little or no mixing energy to the fluids.

In one particularly preferred embodiment of the present invention, the coalescence media is maintained in place by retaining means, such as vertical rings 29 which may be solid or screen-like and, in addition to retaining the coalescence media 28 around the periphery of the stack of horizontal plates 11, also serves to prevent rubbing of the plates 11 against the coalescence media 28. Thus, it is preferred in effect that there be a ring 29 for each plate 11 located in a zone within the column proper having coalescence media 28 also located therein.

The amount of the coalescence material that is employed in the extractor of the present invention is not critical. In general, however, the layer of coalescence material that is employed is relatively thin. Indeed, in columns having diameters of from about 3 feet to about 6 feet, for example, the coalescence media thickness when vertically arranged would be generally only of about 3 inches to about 12 inches.

An important preferred feature of the present invention, as also shown in FIG. 2, is the provision of anti-bypass means such as the horizontal disc or discs 30 which assist in directing the flow of liquid phases from the coalescence media 28 back out into the agitation zone of the column and thereby prevent the emulsion from bypassing the agitation zone. The disc or discs 30, in general, will be located below and spaced apart from rings 29. The number of discs 30 employed is not critical and is a matter of design choice. Preferably, however, the number of discs 30 employed will correspond to the number of plates 11 that are located in the region of the column proper that contains coalescence media 28.

Figure 3:
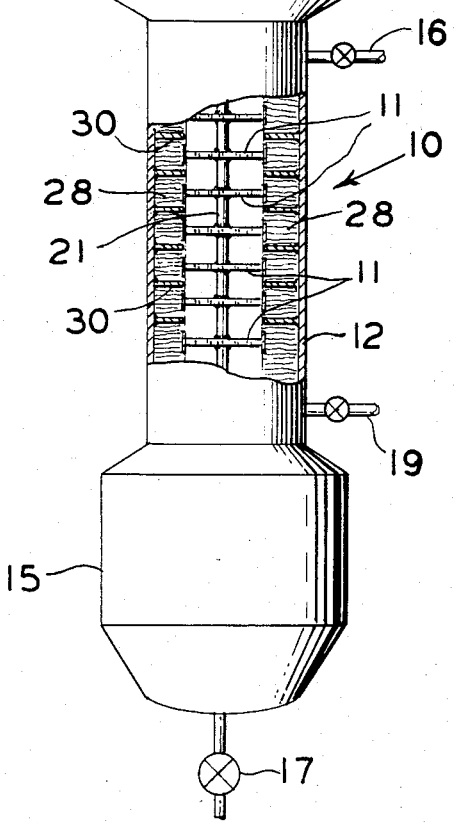
FIG. 3 is a sectional side elevation showing another embodiment of an extractor of the present invention in which the coalescence media is arrange vertically around the plate stacks in an enlarged section of the extractor.
Figure 3:
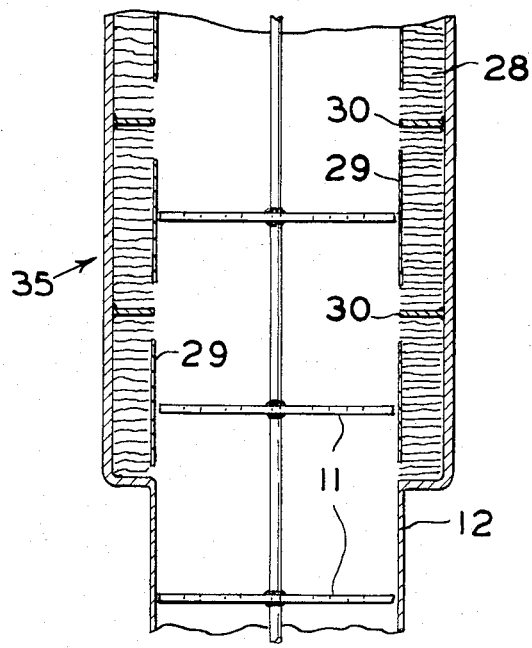

In the embodiment shown in FIG. 3, the extractor as provided with slightly enlarged diameter zone 35 which, of course, is located in an emulsion prone section of the extractor 10, for example, such as a section near an emulsion prone inlet.

Figure 4:
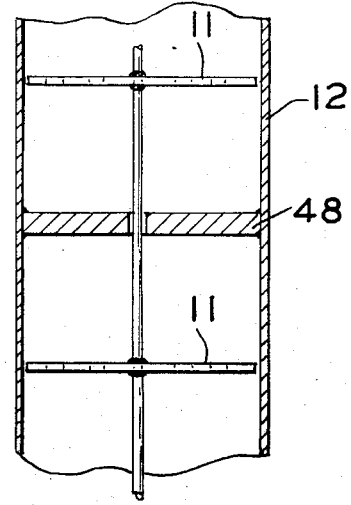
FIG. 4 is a fragmentary side elevation showing the horizontal arrangement of coalescence media in accordance with another embodiment of the present invention.

Referring now to the embodiment as shown in FIG. 4, the coalescence media 48 is horizontally arranged between two reciprocating plates 11 of the extractor 10. Of course, a plurality of horizontally arranged coalescence layers such as 48 of FIG. 4 can be located between other or all of the plates of the extractor. In general, however, the coalescence media 48 is located only in the emulsion prone zone within extractor 10. Optionally the thickness of media 48 can be varied over a wide range. Thus, it can constitute a single layer of relatively thin material up to filling the entire space between adjacent plates 11.

Basically, the presence of the coalescence media in the extractor of the present invention results in the delay of onset of flooding due to emulsion buildup with the concomitant result that higher flow rates can be achieved with the extractor.

It should be readily appreciated that the extractor of the present invention is particularly suitable for extraction processes such as lube oil production, aromatics recovery and alcohol extraction from sulfuric acid.

What is claimed is:

1. In a liquid-liquid extractor of the reciprocating plate type having a column proper with a plurality of plates located therein and means operably connected thereto for imparting reciprocating motion to said plates, the improvement comprising locating coalescence media in said column proper at least in a zone therein, which under conditions of use is emulsion prone.

2. The improvement of claim 1 wherein said coalescence media is vertically located around the periphery of a plurality of plates.

3. The improvement of claim 2 including anti-bypass means disposed in said zone containing coalescence media which under conditions of use assists in directing the flow of liquid phases from said coalescence media to said plates.

4. The improvement of claim 3 wherein said anti-bypass means are solid horizontally disposed discs.

5. The improvement of claim 2 including means for retaining said coalescence media in said extractor and preventing contact thereof with said plates.

6. The improvement of claim 5 wherein said means are vertical rings.

7. The improvement of claim 6 wherein said rings are selected from solid or screen-like rings.

8. The improvement of claim 1 wherein said coalescence media is horizontally located between at least two adjacent plates.

9. The improvement of claim 8 wherein said coalescence media is horizontally disposed between a plurality of plates.

10. The improvement of claim 1 wherein the coalescence media is one which is wetted by the dispersed phase under conditions of use.

11. The improvement of claim 10 wherein the coalescence media is a combination of two materials, one of which is wetted by the continuous phase and the other by the discontinuous phase under conditions of use.

* * * * *